(12) United States Patent
Bessho et al.

(10) Patent No.: US 8,439,141 B2
(45) Date of Patent: May 14, 2013

(54) WORK VEHICLE HAVING ENGINE AND BELT-TYPE CONTINUOUSLY VARIABLE TRANSMISSION DEVICE

(75) Inventors: Hiroki Bessho, Sakai (JP); Ryouzou Imanishi, Kishiwada (JP); Shoichiro Kawamura, Hannan (JP); Masatake Murakawa, Osaka (JP)

(73) Assignee: Kubota Corporation, Osaka (JP)

( * ) Notice: Subject to any disclaimer, the term of this patent is extended or adjusted under 35 U.S.C. 154(b) by 251 days.

(21) Appl. No.: 13/051,625

(22) Filed: Mar. 18, 2011

(65) Prior Publication Data
US 2012/0055729 A1 Mar. 8, 2012

(30) Foreign Application Priority Data
Sep. 2, 2010 (JP) ................................. 2010-196924

(51) Int. Cl.
*B60K 11/06* (2006.01)
(52) U.S. Cl.
USPC ........................ 180/68.2; 180/68.1; 180/339
(58) Field of Classification Search .................. 180/309, 180/68.1, 68.2, 68.3, 339; 123/41.56, 41.7, 123/41.44, 41.48
See application file for complete search history.

(56) References Cited

U.S. PATENT DOCUMENTS

| 5,029,668 | A | * | 7/1991 | Murakawa et al. | 181/240 |
| 5,689,953 | A | * | 11/1997 | Yamashita et al. | 60/316 |
| 7,363,999 | B2 | * | 4/2008 | Hastings | 180/220 |
| 7,562,739 | B2 | * | 7/2009 | Lan et al. | 180/339 |
| 2006/0011401 | A1 | | 1/2006 | Nakamura et al. | |

FOREIGN PATENT DOCUMENTS

| JP | 2005238988 A | 9/2005 |
| JP | 200627425 A | 2/2006 |

* cited by examiner

*Primary Examiner* — John Walters
(74) *Attorney, Agent, or Firm* — The Webb Law Firm

(57) ABSTRACT

A work vehicle includes: a muffler which flows exhaust from an engine and extends in a transverse direction so as to allow the exhaust from the engine to flow in the transverse direction; and a CVT case for covering a belt-type CVT positioned frontward of the muffler in a longitudinal direction. The CVT case includes a cooling structure for introducing cooling air from outside, cooling the belt-type CVT, and discharging the cooling air from a discharge part. An exhaust duct includes an inflow opening to be connected to the discharge part for allowing the cooling air to flow into the exhaust duct, and an exhaust opening for allowing the cooling air to flow out rearward. The exhaust opening is elongated in an extending direction of the muffler and oriented in a direction that allows the cooling air flowing out to hit the muffler.

6 Claims, 9 Drawing Sheets

WORK VEHICLE HAVING ENGINE AND BELT-TYPE CONTINUOUSLY VARIABLE TRANSMISSION DEVICE

BACKGROUND

1. Field of the Invention

The present invention relates to a cooling technique of a belt-type continuously variable transmission device (CVT) and a muffler in a work vehicle having an engine and the belt-type CVT.

2. Description of the Related Art

With respect to the cooling technique of the belt-type CVT, Japanese Unexamined Patent Application Publication No. 2005-238988 describes a vehicle in which a body frame is provided with an engine, a belt-type CVT for changing a driving force of the engine, and a muffler connected to an exhaust pipe of the engine. In this patent document, the belt-type CVT has a transmission cooling system for sucking external cooling air from a feed duct; supplying the cooling air into a belt case to thereby cool the belt-type CVT; and sending this cooling air from the belt case through an exhaust duct to a rear part of a vehicle body. The exhaust duct and the muffler are arranged in parallel with each other in a lateral direction, and a discharge direction of a discharge port at a rear end of the exhaust duct is oriented to the muffler, to thereby lead the cooling air discharged from the discharge port to the muffler and to cool the muffler.

However, in a case where the discharge port at the rear end of the exhaust duct is oriented in the lateral direction of the vehicle body, when the vehicle body is running, an air flow from outside acts on the cooling air discharged from the discharge port. When the air flow from outside acts on the cooling air discharged from the discharge port, a position on the muffler on which the cooling air is blown is displaced rearward of the vehicle body and the cooling air discharged from the discharge port is diffused by the air flow from outside. As a result, an amount of the cooling air led to a surface of the muffler is reduced, and thus cooling performance is lowered.

Similar to the above-described prior art, Japanese Unexamined Patent Application Publication No. 2006-27425 describes a transmission cooling system for sucking the external cooling air from an intake duct; supplying the cooling air into the belt case to thereby cool the belt-type CVT; and sending this cooling air from the belt case through a discharge duct to the rear part of the vehicle body. The muffler and the discharge duct are parallelly arranged closer to each other. In this case, by positioning the muffler (object to be cooled) closer to the discharge duct (cooling means), an area around the muffler is effectively cooled.

However, even though the lowering in the cooling performance by the air flow from outside during the vehicle body running is suppressed, the cooling itself is not so efficient.

SUMMARY OF THE INVENTION

In view of the above, it is desirable to provide a work vehicle in which temperature raise of the muffler is suppressed by utilizing the cooling air which has been used for cooling the belt-type CVT.

The work vehicle according to the present invention having an engine and a belt-type CVT, includes: a muffler which is configured to flow exhaust from the engine and extends in a transverse direction of a vehicle body so as to allow the exhaust from the engine to flow in the transverse direction of the vehicle body; a CVT case which is configured to cover the belt-type CVT and positioned forward of the muffler in a longitudinal direction of the vehicle body; and an exhaust duct including an inflow opening to be connected to a discharge part of the CVT case for allowing cooling air to flow into the exhaust duct and an exhaust opening for allowing the cooling air to flow out rearward of the vehicle body. The CVT case includes a cooling structure configured to introduce the cooling air from outside, cool the belt-type CVT, and discharge the cooling air from the discharge part. The exhaust opening of the exhaust duct is elongated in an extending direction of the muffler and oriented in a direction that allows the cooling air flowing out to hit the muffler. A cross-sectional horizontal length of the exhaust opening in the extending direction of the muffler is longer than a cross-sectional horizontal length of the inflow opening, and a cross-sectional vertical length of the exhaust opening is shorter than a cross-sectional vertical length of the inflow opening.

According to this configuration, the cooling air which has been used for cooling an inside of the CVT case is discharged from the discharge part of the CVT case through the exhaust duct to a rear side of the vehicle body, and blown to the muffler in a direction orthogonal to an extending direction of the muffler (longitudinal direction of the muffler). In other words, the cooling air hits directly into the muffler. Accordingly, when the vehicle body is running, the cooling air discharged from the discharge part reaches the surface of the muffler without being influenced by the air flow from outside, and thus the cooling of the muffler is achieved. In addition, since a cross section of the exhaust opening for exhausting the cooling air is formed so as to correspond to the muffler in the extending direction, a hitting degree on the muffler by the cooling air is high, and the hitting is efficient. As a result, temperature raise of the muffler is effectively suppressed by utilizing the cooling air which has been used for cooling the belt-type CVT.

It is convenient when a heat shield plate is arranged along an outer face of the muffler at a distance, and the cooling air discharged from the exhaust duct is supplied to a space between the muffler and the heat shield plate. With this configuration, by supplying the cooling air from the exhaust duct to the space between the outer face of the muffler and the heat shield plate, the cooling is realized in which the cooling air is continuously brought into contact with the outer face of the muffler. In other words, as compared with a local cooling in which the cooling air is simply blown to an object, a wider area of the outer face of the muffler can be efficiently cooled.

By setting the cross-sectional horizontal length of the exhaust opening to approximately twice the cross-sectional horizontal length of the inflow opening, a wider area of the outer face of the muffler can be cooled.

BRIEF DESCRIPTION OF THE DRAWINGS

FIG. 5 is a side view showing arrangement of an engine, a belt-type CVT, and the like.

FIG. 6 is a perspective view showing the arrangement of the engine, the belt-type CVT, and the like.

FIG. 7 is a plan view showing the arrangement of the engine, the belt-type CVT, and the like.

DETAILED DESCRIPTION OF PREFERRED EMBODIMENTS

Hereinbelow, embodiments of the present invention will be described in detail with reference to the accompanying drawings.

(Overall Configuration)

Figure 1:
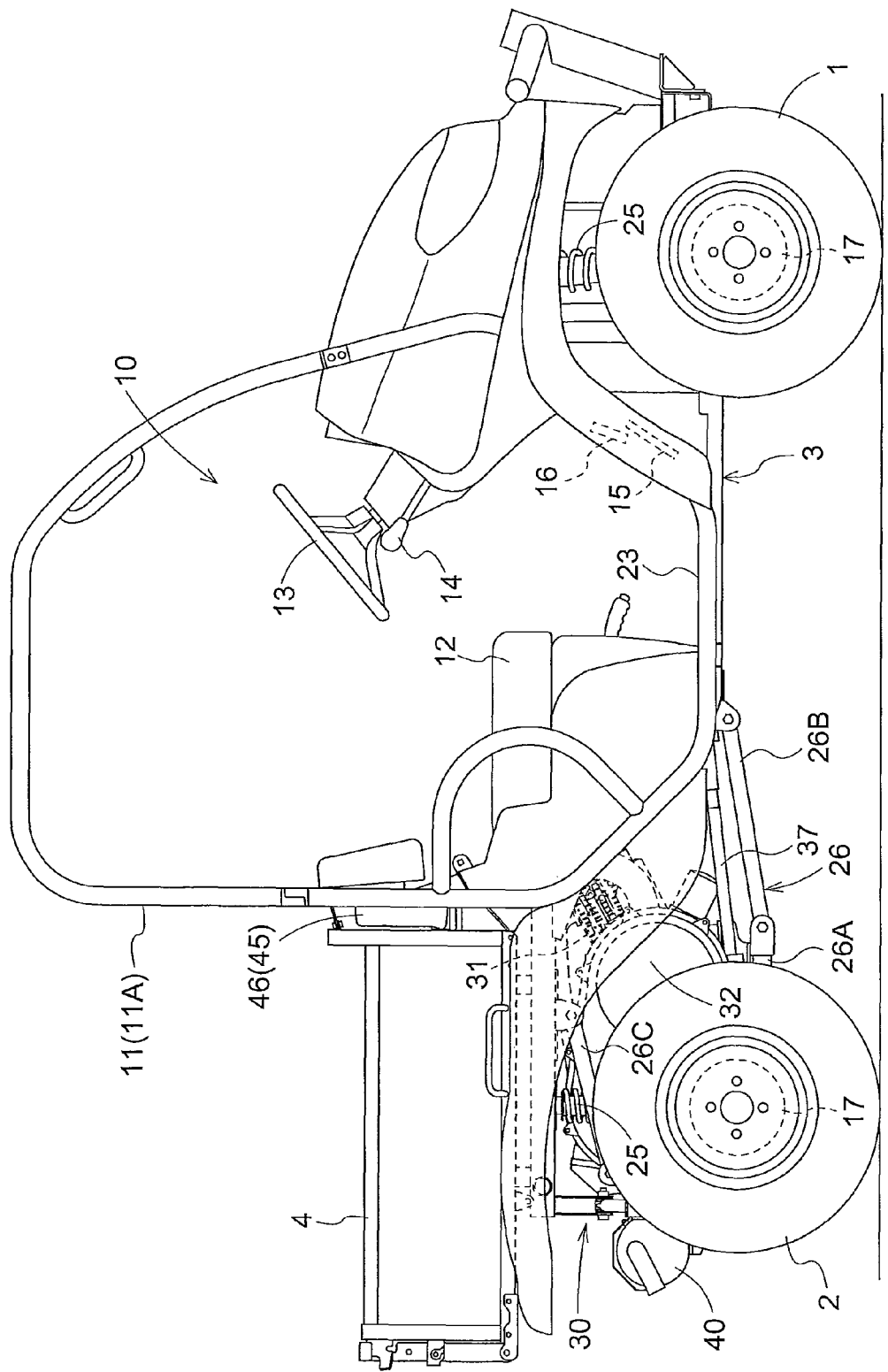
FIG. 1 is a side view of a work vehicle.
Figure 2:
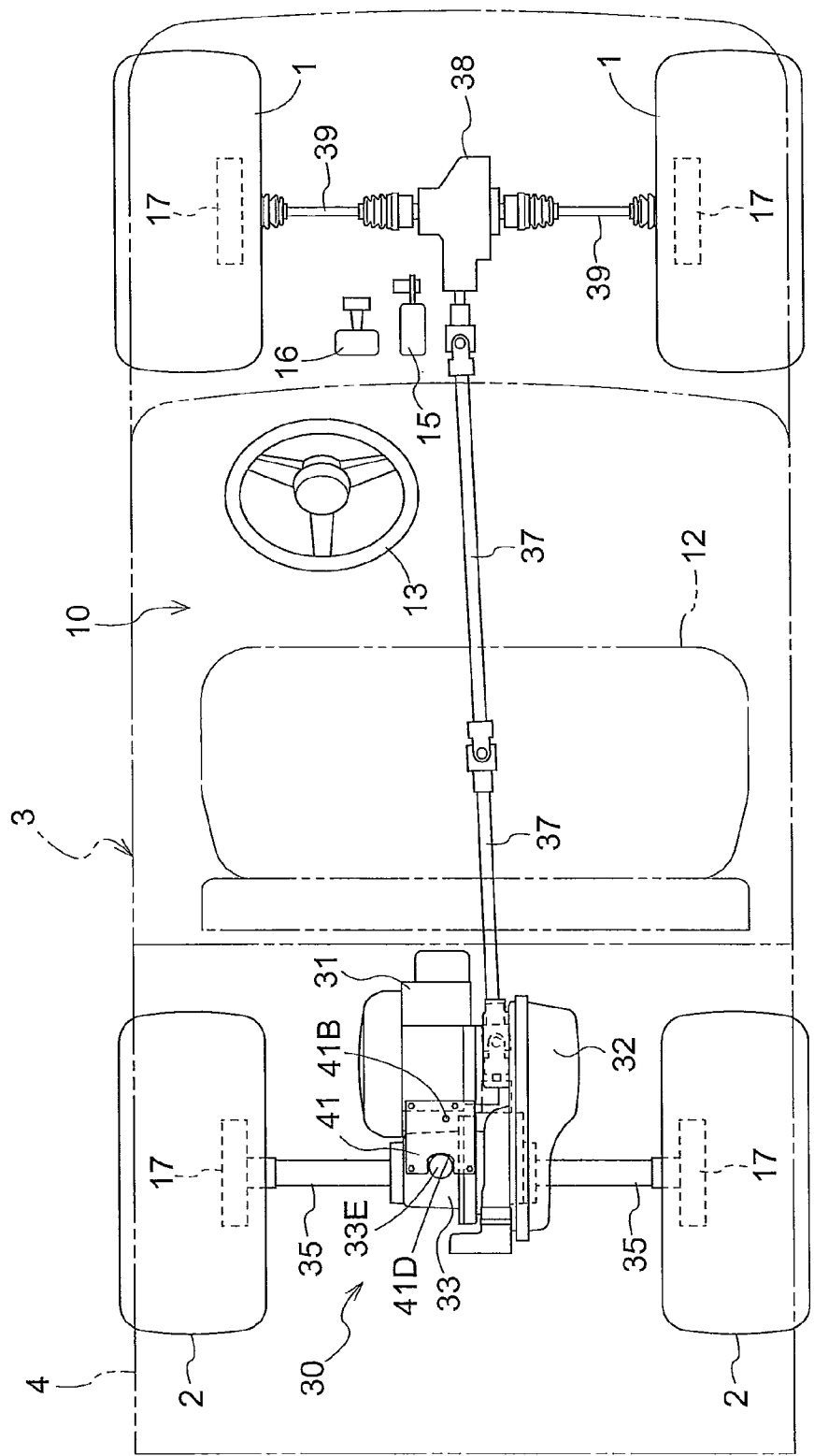
FIG. 2 is a plan view showing a configuration of transmission of the work vehicle.

As shown in FIGS. 1 and 2, a work vehicle includes: a pair of freely steerable right and left front wheels 1 and a pair of right and left rear wheels 2 provided in a vehicle body 3; a driving part 10 disposed in a middle part of the vehicle body 3; a truck box 4 disposed in a rear part of the vehicle body 3; and a motor part 30 disposed below the truck box 4.

This work vehicle is configured as a four-wheel-drive type in which a driving force is transmitted from the motor part 30 to the front wheels 1 and the rear wheels 2, and is used for multipurpose work, including agricultural work and transportation work. At a position surrounding the driving part 10, a protection frame 11 for protecting the driving part 10 is provided.

The truck box 4 has a function of dump-wise discharging a load by raising a front end side of the truck box 4, and a rear end of the truck box is swingably supported by the vehicle body 3 about an axis. In addition, an actuator (not shown) of a hydraulic type is provided which is for raising and lowering the front end side of the truck box 4.

The driving part 10 includes: a driver's seat 12 on which a driver is to be seated; a steering wheel 13 for controlling steering of the front wheels 1; a shift lever 14; an accelerator pedal 15 for controlling a running speed; and a brake pedal 16 for operating braking devices 17 of the front wheels 1 and the rear wheels 2. A passenger seat is provided next to the driver's seat 12, and the driving part 10 is provided with a bench seat formed of a single seat base and a single seat back both elongated in a transverse direction of the vehicle body.

The shift lever 14 is configured to set the running speed and switch between a forward movement and a backward movement by a single lever operation. Alternatively, for example, the driving part 10 may be provided with two levers, including a lever for gear change and a forward-reverse lever for switching between the forward movement and the backward movement.

Figure 3:
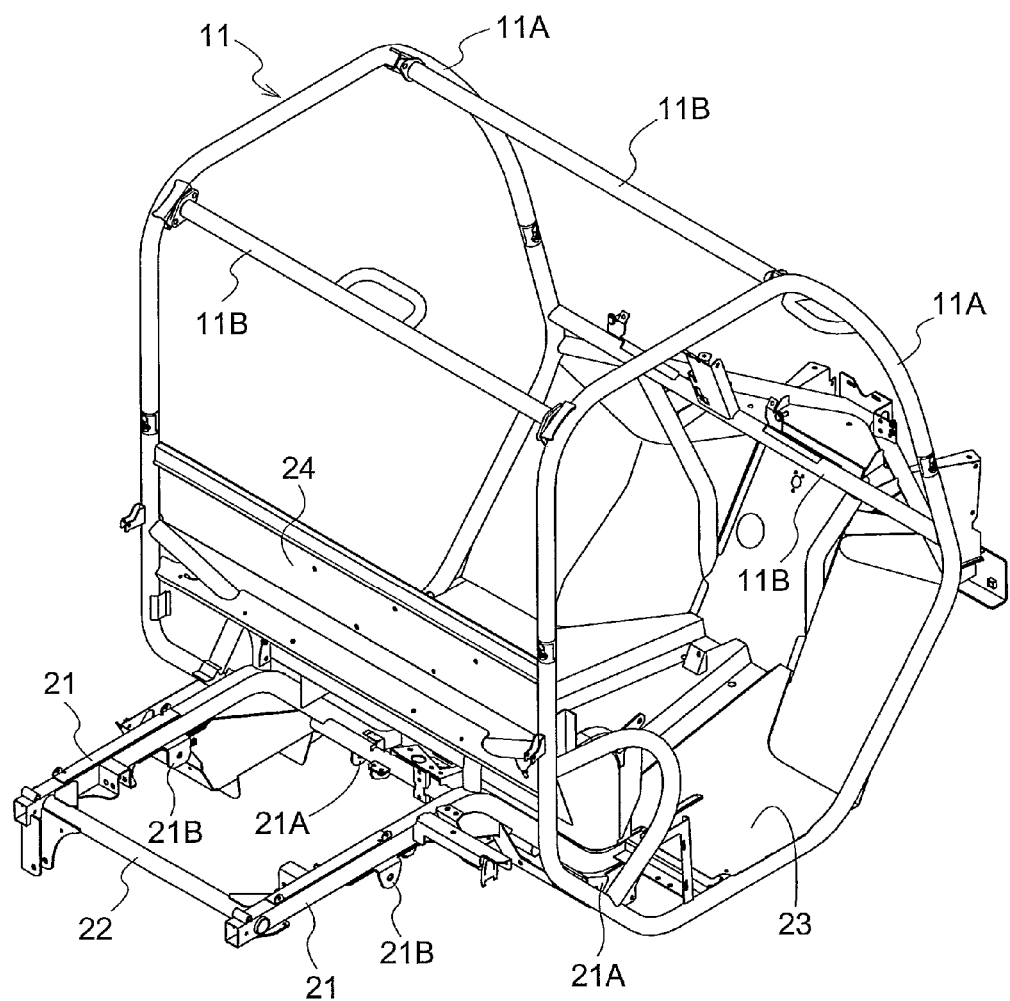
FIG. 3 is a perspective view showing a configuration of frame.

As shown in FIG. 3, a body frame forming the vehicle body 3 has: a pair of right and left main frames 21 extending below the driving part 10 in a front-rear direction from a front end of the vehicle body to the motor part 30; and a plurality of cross-frames 22 connecting the right and left main frames 21. The protection frame 11 is formed of: a pair of right and left side frames 11A; and a plurality of transversal frames 11B connecting the right and left side frames 11A. The protection frame 11 is connected to a pair of the right and left main frames 21 through an intermediate frame and the like.

Each of the right and left side frames 11A is formed in a loop shape and a step 23 made of a plate is provided at a position where lower end parts of the side frames 11A and a pair of the right and left main frames 21 are connected. In addition, a back plate 24 bridging a space between the right and left side frames 11A is provided rearward of the driver's seat 12. The step 23 serves a boarding area for the driver, and the back plate 24 supports the seat back of the driver's seat 12.

As shown in FIGS. 2 and 4-7, the motor part 30 includes: an engine 31 of an air-cooling type; a dry- and belt-type continuously variable transmission device (CVT) 32; and a transmission. The transmission includes a transmission case 33 in which a gear shift mechanism (not shown) and a differential mechanism (not shown) are installed. In a lower end part of the transmission case 33, there are provided a pair of right and left rear wheel drive shafts 34 for transmitting the driving force from the differential mechanism to the rear wheels 2, and rear axle cases 35 encasing the respective rear wheel drive shafts 34.

From the lower end part of the transmission case 33, a power take-off shaft 36 extends frontward. In a lower part of the vehicle body 3, an intermediate shaft 37 for transmitting the driving force from the power take-off shaft 36 is provided, and the driving force is transmitted from the intermediate shaft 37 to a differential case 38 in a front part of the vehicle body 3 in which a front wheel drive shaft 39 for transmitting the driving force from the differential case 38 to the front wheels 1 is provided.

A universal coupling, such as Cardan joint, is disposed between the power take-off shaft 36 of the transmission and the intermediate shaft 37, and likewise, another universal coupling is disposed between the front and rear intermediate shafts 37, and still another universal coupling is disposed between the intermediate shaft 37 and an input shaft of the differential case 38. In addition, a universal coupling, such as Cardan joint, is disposed between an output shaft of the differential case 38 and the front wheel drive shaft 39, and likewise, another universal coupling is disposed between the front wheel drive shaft 39 and a shaft of the front wheel 1.

Though not shown, in the transmission case 33, a clutch mechanism is encased which is switchable between a transmitting state in which the driving force is transmitted to the power take-off shaft 36 and a cut-off state in which the driving force is cut off. The clutch mechanism is switchable through an operation by the driver, and by setting the clutch mechanism to the transmitting state, a four-wheel-drive state is obtained in which the rear wheels 2 and the front wheels 1 are driven at the same time, and by setting the clutch mechanism to the cut-off state, a two-wheel-drive state is obtained in which only the rear wheels 2 are driven.

It should be noted that the braking device 17 is provided on each of axle ends of a pair of the right and left front wheel drive shafts 39 and each of axle ends of a pair of the right and left rear wheel drive shafts 34. The braking devices 17 function in such a manner that the braking force acts on the front wheels 1 and the rear wheels 2 by an operation of the brake pedal 16.

The gear shift mechanism (not shown) of the transmission is operated by the shift lever 14. The gear shift mechanism is configured to change the running speed of the vehicle body 3 and switch running directions (between the forward movement and the backward movement) in accordance with the operation of the shift lever 14.

(Suspension)

The right and left front wheels 1 are mounted on the body frame by independent front suspension of a strut type. In other words, in each of the front wheels 1, a base end side of a lower arm (not shown) is swingably supported by the body frame, and an axle of the front wheel 1 is supported by a swingable end portion of the lower arm. Between the lower arm and the body frame, a suspension unit 25 (see FIG. 1) formed of a coil spring and a shock absorber is provided. With this configuration, the front wheels 1 are mounted on the vehicle body.

With this suspension, the right and left front wheels 1 are independently movable in a vertical direction in accordance with roughness of a road surface, and when a vertical movement involves a shock, the shock is absorbed by the suspension unit 25.

Figure 4:
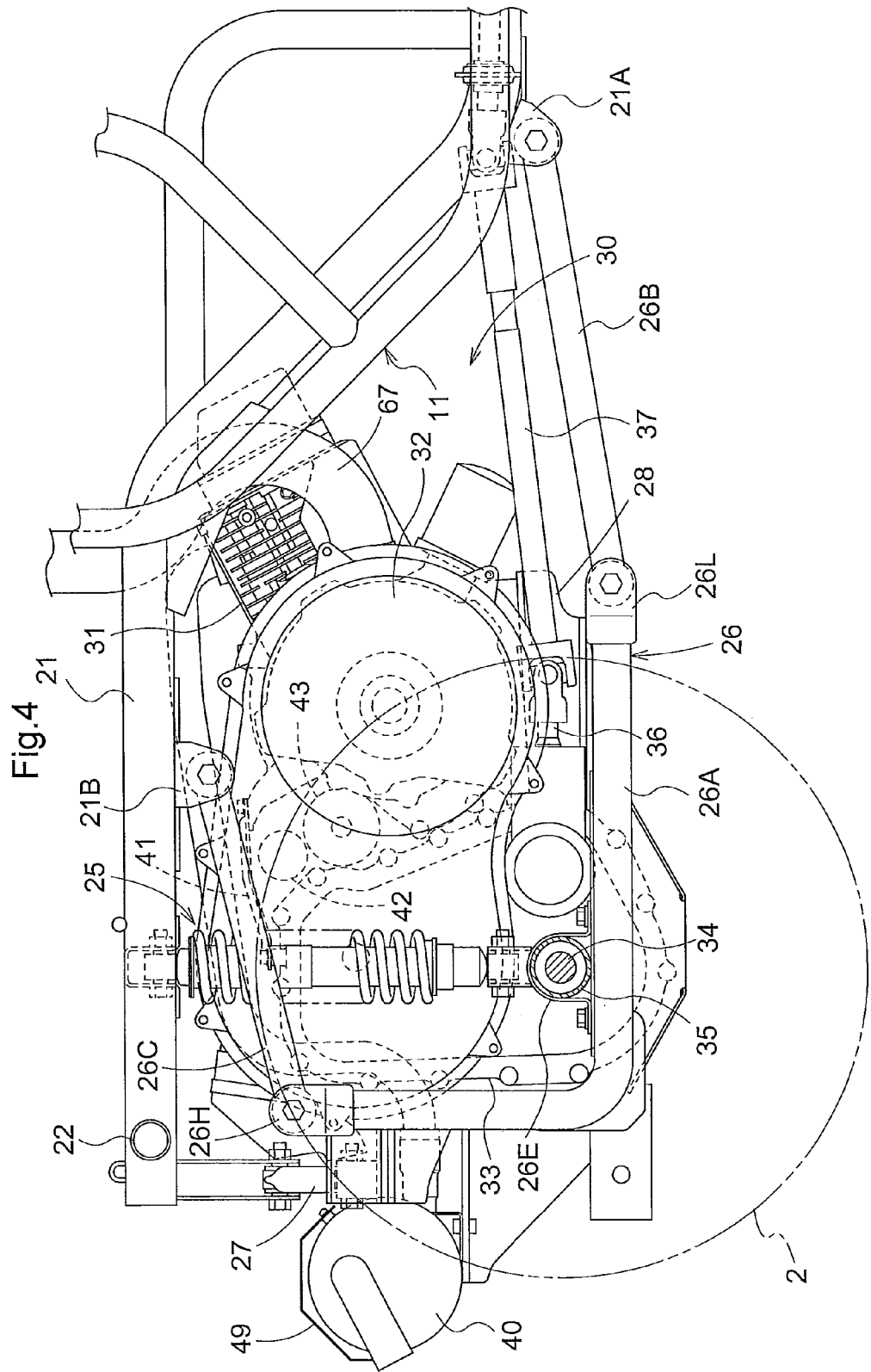
FIG. 4 is a side view showing a configuration of suspension of rear wheels.
Figure 5:
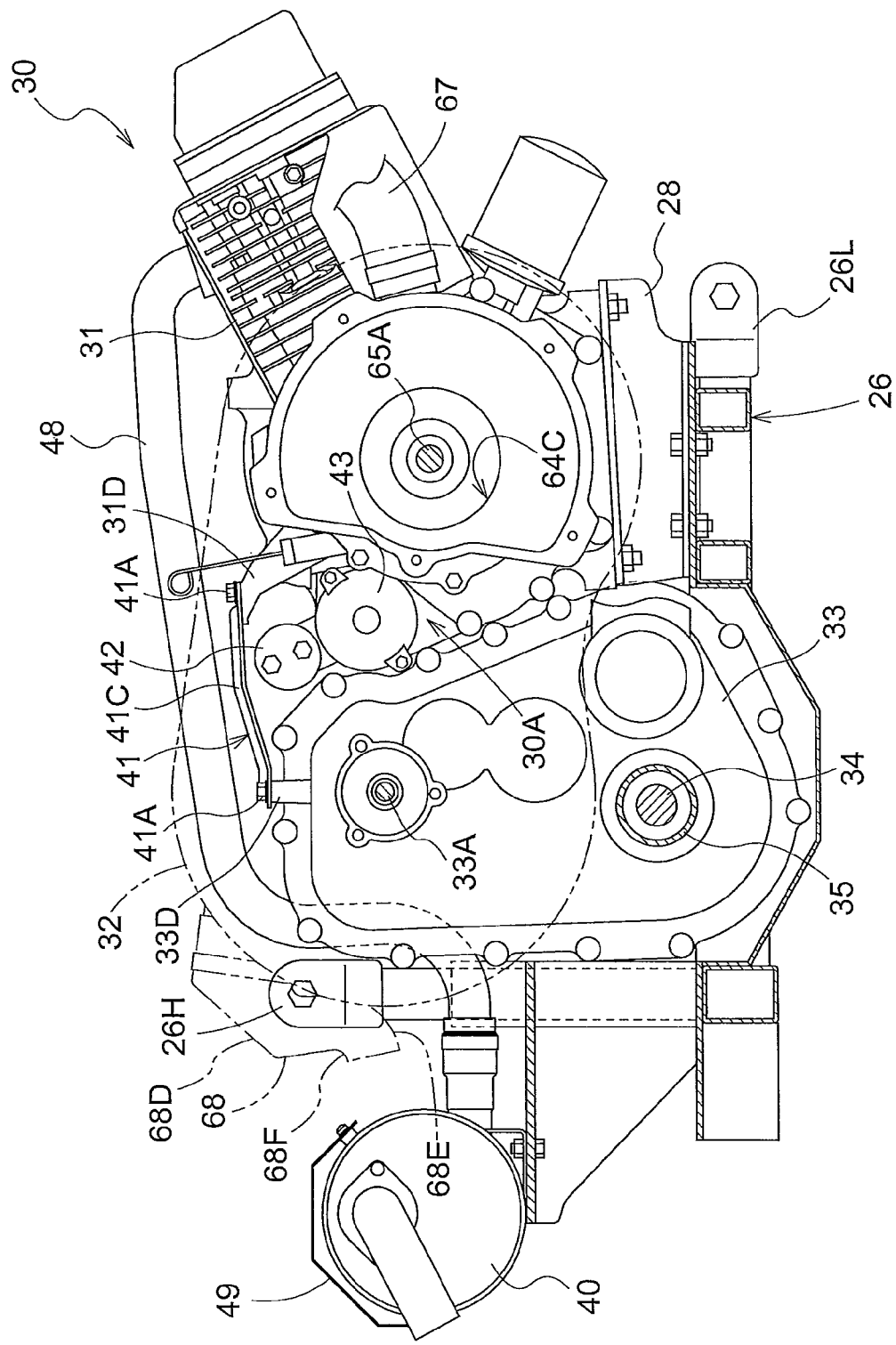
Figure 6:
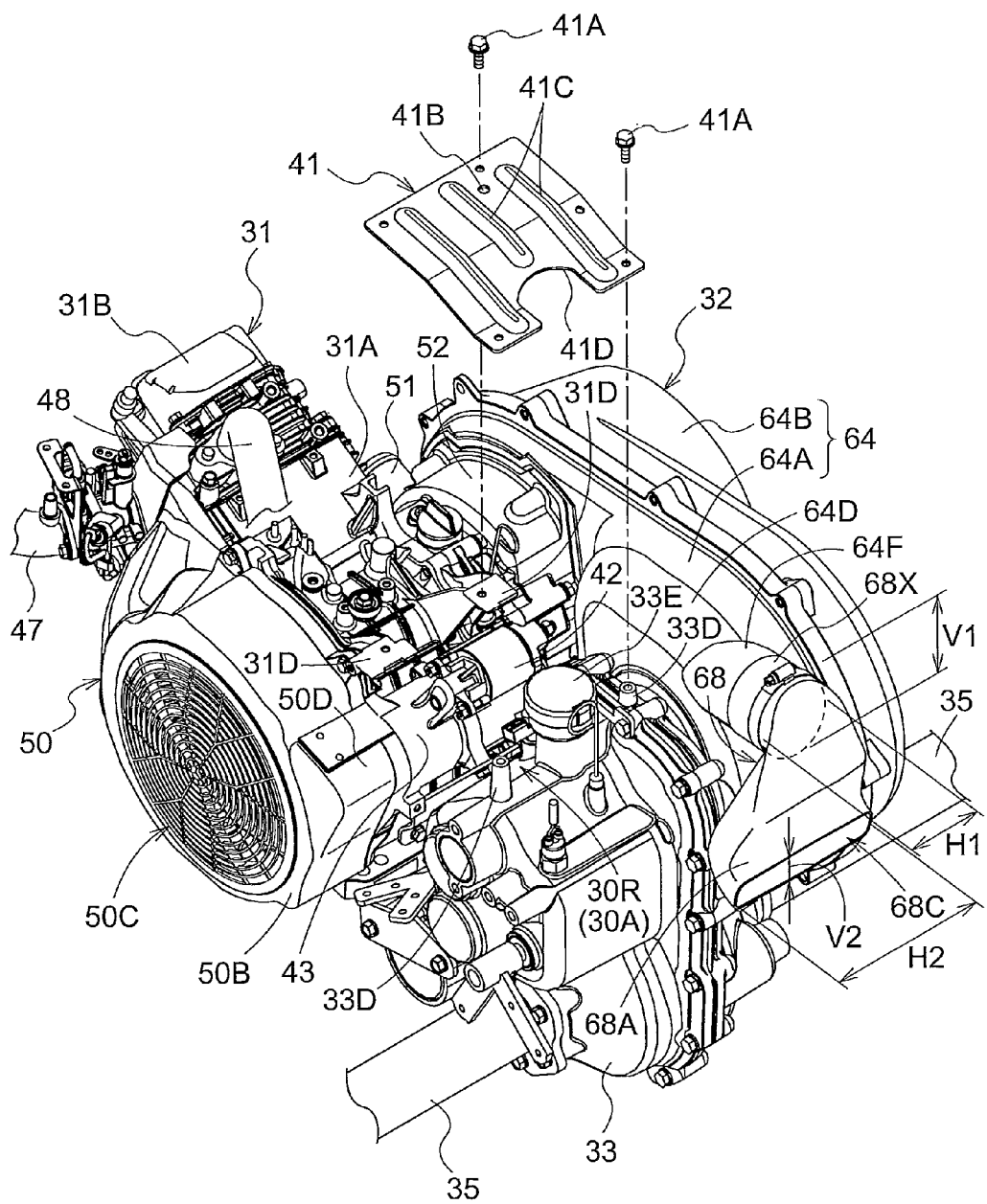

As shown in FIGS. 1, 4 and 5, the right and left rear wheels 2 are mounted on the body frame by rigid axle suspension. In other words, the right and left main frames 21 are provided with a pair of right and left auxiliary frames 26. The rear axle cases 35 is supported by the respective auxiliary frames 26, and between the rear axle cases 35 and the body frame, the respective suspension units 25 each formed of the coil spring and the shock absorber are provided. With this configuration, the rear wheels 2 are mounted in the vehicle body.

A pair of the right and left auxiliary frames 26 includes: a pair of right and left side members 26A each bent in a L-shape; lower arms 26B swingably connecting respective front ends of a pair of the right and left side members 26A and the main frame 21; and upper arms 26C swingably connecting respective upper ends of a pair of the right and left side members 26A and the main frame 21. A pair of the right and left side members 26A are connected through a connection frame 28 which supports a bottom part of the engine 31 in a connected state.

Specifically, a front end of the lower arm 26B is swingably connected to a bracket 21A on a lower face of an intermediate part of the main frame 21 through a rubber bush. A rear end of the lower arm 26B is swingably connected to a bracket 26L at the front end of the side member 26A through a rubber bush. In addition, a front end of the upper arm 26C is swingably connected to a bracket 21B on a lower face of a rear part of the main frame 21 through a rubber bush. A rear end of the upper arm 26C is swingably connected to a bracket 26H at a rear end of the side member 26A. Further, the right and left side members 26A are supported on the main frame 21 through a lateral rod 27.

The rear axle case 35 is connected to an upper face of the right (left) side member 26A by a holder 26E to which a lower end part of the suspension unit 25 is connected. In addition, the bottom part of the engine 31 is supported on the connection frame 28 connecting the right and left side members 26A, as described above. With this configuration, the engine 31 and the transmission case 33 are supported by the right and left side members 26A.

Accordingly, when the right and left rear wheels 2 moves vertically in accordance with the roughness of the road surface, the transmission, the engine 31 and the belt-type CVT 32 integrally move in the vertical direction along with the vertical movement of the rear axle case 35. When the vertical movement involves a shock, the shock is absorbed by the suspension unit 25.

(Motor Part)

As shown in FIGS. 4-8, in the motor part 30, the engine 31 is arranged in such a manner that a crankshaft 31C (see FIG. 8) is transversally oriented, and rearward of and next to the engine 31, the transmission case 33 is arranged in such a manner that an input shaft 33A is transversally oriented. Rearward of the transmission case 33, a muffler 40 transversally extending is disposed, and the belt-type CVT 32 is disposed on a lateral side of both the engine 31 and the transmission case 33. The muffler 40 is in a shape of a column whose axis is transversally oriented and whose lower end part is fixed to a bracket extended from the auxiliary frame 26.

The engine 31 is configured in such a manner that a cylinder head 31B is connected to a cylinder block 31A by which the crankshaft 31C is supported. The cylinder head 31B is connected to the cylinder block 31A so that the cylinder head 31B is positioned obliquely above and frontward of the cylinder block 31A. Accordingly, a difference in a height level between an upper face of the cylinder block 31A and the cylinder head 31B is suppressed small, so as to make a size of the entire engine in the vertical direction compact.

Since the engine 31 and the transmission case 33 are arranged next to each other in the front-rear direction, a space 30A is formed between an upper part of the engine 31 (upper part of the cylinder block 31A) and an upper part of the transmission case 33. A pair of right and left connecting projections 31D protrude obliquely upward and rearward from the upper face of the cylinder block 31A, and a pair of right and left connecting projections 33D protrude upward from an upper face of the transmission case 33. A flat connecting plate 41 is horizontally disposed above and away from an upper face of the engine 31 and the upper face of the transmission case 33 at a position above the space 30A, and a front end part of the connecting plate 41 is connected to horizontal parts on a rear end side of the connecting projection 31D with bolts 41A, while a rear end part of the connecting plate 41 is connected to horizontal parts of an upper end of the connecting projection 33D with the bolts 41A. The connecting plate 41 is folded in a shape of a reversed shallow V seen from a side (in a mountain fold), and has a cover part that defines a space therebelow. Reinforcing ribs 41C protruding upward and extending in the front-rear direction are formed in an upper face of the cover part, and in a rear part of the connecting plate 41, a cutout 41D is formed which allows access to an opening 33E for maintenance of the transmission case 33.

The connecting plate 41 is arranged so that the cover part is disposed nearly horizontally, and therefore, even when a tensile force in an endless belt 63 of the belt-type CVT 32 is exerted between an output shaft 65A of the engine 31 and the input shaft 33A of the transmission, the connecting plate 41 prevents a displacement in relative position between the engine 31 and the transmission case 33. In other words, the output shaft 65A of the engine 31 and the input shaft 33A of the transmission are retained at approximately the same height level while they are transversally oriented. Accordingly, a width direction of the connecting plate 41 nearly coincides with an axial direction of the output shaft 65A and an axial direction of the input shaft 33A.

Figure 8:
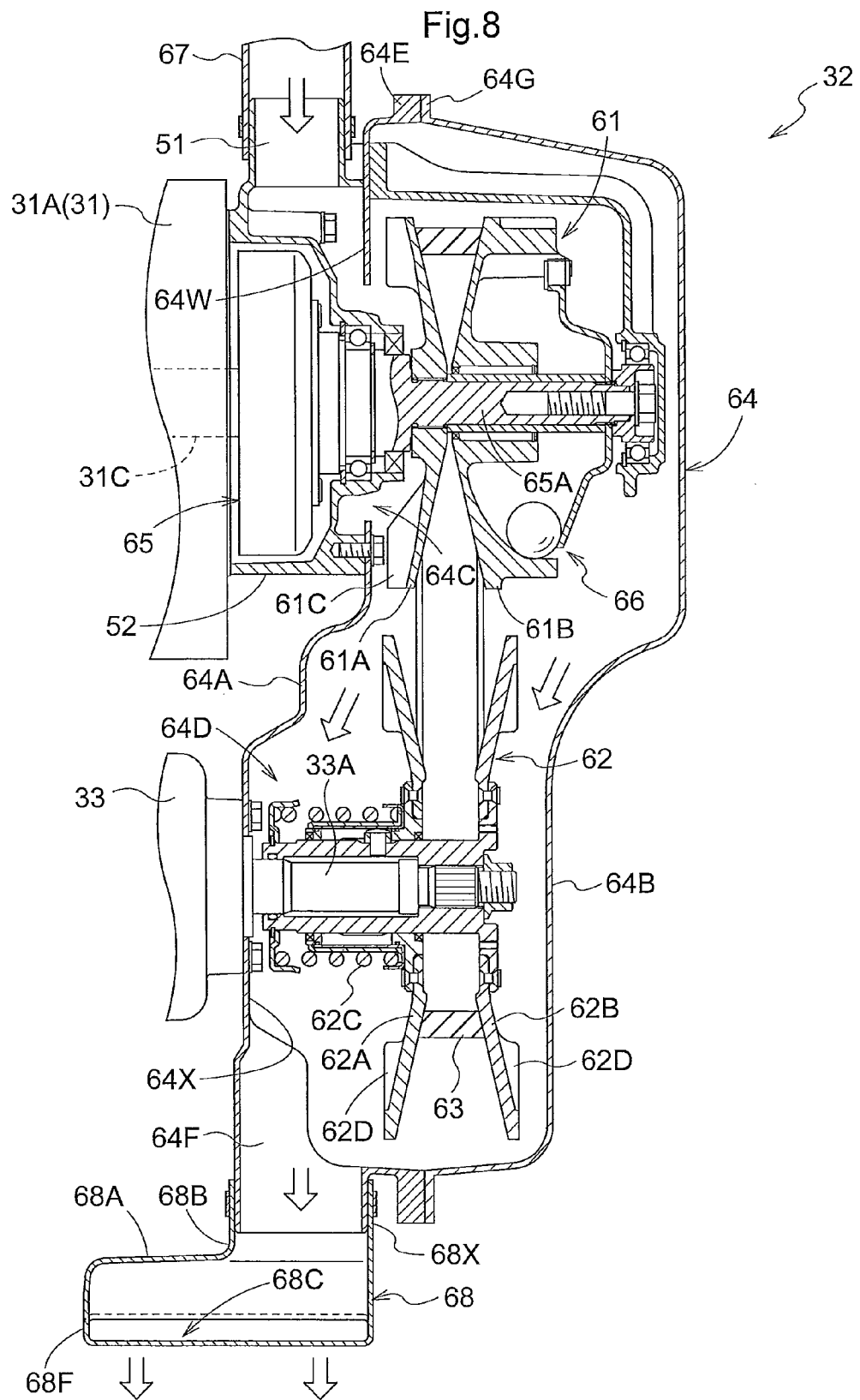
FIG. 8 is a planar diagram showing a cooling air flow in the belt-type CVT.

As shown in FIG. 8, in the belt-type CVT 32, the output shaft 65A is provided with a driving pulley 61, the input shaft 33A is provided with a driven pulley 62, and the endless belt 63 is wound around the pulleys 61,62. Since the width direction of the connecting plate 41 nearly coincides with the axial direction of the output shaft 65A and the axial direction of the input shaft 33A as described above, the tensile force in the endless belt 63 is exerted in a direction that makes outer end sides of the axes move closer, and the connecting plate 41 with a lateral width receives this tensile force. Therefore, with the presence of the connecting plate 41, the displacement in the relative position between the engine 31 and the transmission case 33 can be prevented.

The connecting plate 41 may be inclined more or less relative to the axis of the output shaft 65A and the axis of the input shaft 33A, as long as the connecting plate 41 is in a posture in which the width direction of the connecting plate 41 can receive the force that is apt to change a positional relationship between the output shaft 65A and the input shaft 33A into a nonparallel state. It should be noted that, as will be described later, the output shaft 65A of the engine 31 serves as the output shaft 65A of a centrifugal clutch 65 to which the driving force is transmitted from the engine 31, and alternatively, the centrifugal clutch 65 may be omitted and the crankshaft 31C of the engine 31 may be extended into a CVT case 64 and serve as output shaft, on which the driving pulley 61 is provided.

In the space 30A, a generator 42 and a starter motor 43 as electric component are disposed, and above these components, the connecting plate 41 is disposed. With this configuration, when the work vehicle is washed or it rains hard, the connecting plate 41 prevents water from entering the generator 42 and the starter motor 43. It should be noted that the electric component to be disposed in the space 30A is not limited to the generator 42 and the starter motor 43, and examples include fuse and electrical wiring for engine.

When the work vehicle is assembled, the engine 31 and the transmission case 33 are connected through the connecting plate 41, and then the belt-type CVT 32 is further connected thereto, to thereby prepare a unified body, which is then mounted on the vehicle body. When maintenance of the work vehicle is performed, the unified body is removed from the vehicle body. In order to facilitate such operations, the connecting plate 41 may have a mount part 41B for a hoisting tool (not shown) for hoisting the unified body. In one example, the mount part 41B is a screw hole formed in the connecting plate 41, and the hoisting tool is supported through threadable engagement with the screw hole. It should be noted that a simple through hole may be provided as the mount part 41B. In this case, a connection structure may be those in which a bolt portion is inserted into the through hole and the hoisting tool and then threadably engaged with a nut to thereby connect and fix the hoisting tool.

It should be noted that, when the unified body is hoisted, in order to realize a stable hoist, it is desirable that the hoisting tools are attached to a plurality of parts of the right and left rear axle cases 35 so as to exert forces in the plurality of the hoisting tools for suspension.

On the lateral side of the engine 31 opposite to the side where the belt-type CVT 32 is disposed, an engine blower unit 50 is provided. The engine blower unit 50 includes: a fan 50A rotatable by the driving force of the engine 31; and a case 50B for encasing the fan 50A. In the case 50B, there are formed an intake opening 50C and a bulging part 50D bulging from a rear part of the case 50B to a side of the space 30A.

Figure 7:
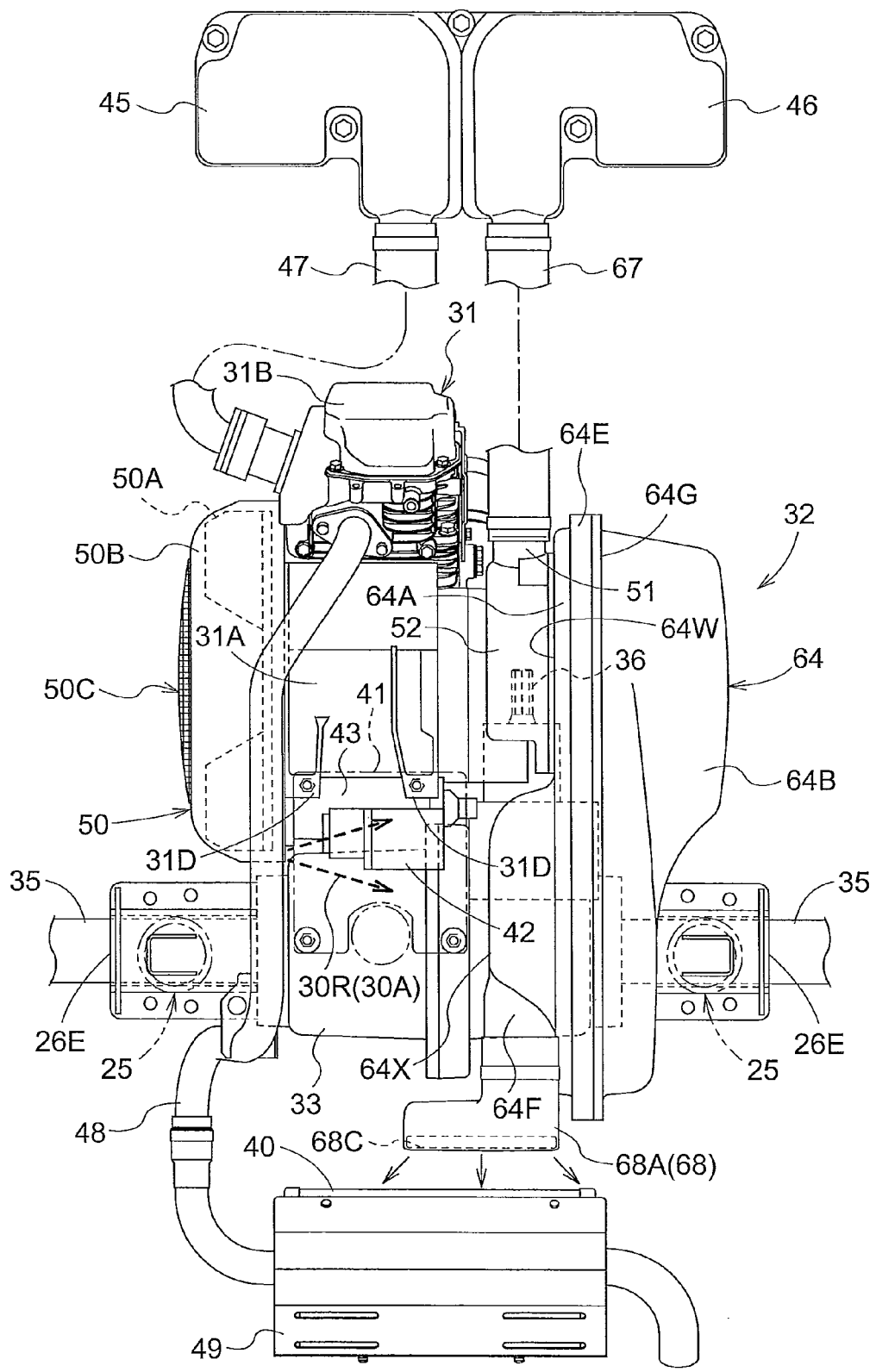

With this configuration, when the engine 31 is operated, along with rotation of the fan 50A, most of cooling air sucked from the intake opening 50C of the case 50B is supplied from one end portion of the case 50B to the cylinder block 31A and the cylinder head 31B. In addition, when the cooling air is supplied in this manner, a portion of the cooling air is sent from the bulging part 50D of the other end part of the case 50B through a cooling air passage 30R as shown in FIG. 7, to the space 30A below the connecting plate 41. The cooling air supplied from the cooling air passage 30R to the space 30A cools the generator 42 and the starter motor 43 as electric components disposed in the space 30A.

As shown in FIGS. 1 and 7, on a back side of the back plate 24, a first air cleaner 45 for intake air of the engine 31 and a second air cleaner 46 for intake cooling air of the belt-type CVT 32 are disposed in a space between the driving part 10 and the truck box 4.

To the cylinder head 31B of the engine 31 is connected to an air-intake pipe 47 whose distal end is connected to the first air cleaner 45. To the cylinder head 31B is connected to an exhaust pipe 48 whose terminal is connected to the muffler 40. The muffler 40 has a cylindrical structure, and is disposed rearward of the transmission case 33 in a posture that a longitudinal direction of the muffler 40 is oriented in the transverse direction of the vehicle body. A heat shield plate 49 made of metal, such as steel plate, is provided so as to surround an upper face part of the muffler 40, and a gap is formed between the heat shield plate 49 and an outer face of the muffler 40. In addition, on the lateral side of the engine 31, the centrifugal clutch 65 is disposed, and an intake part 51 in the vicinity of the centrifugal clutch 65 is connected to an intake duct 67 whose distal end is connected to the second air cleaner 46.

(Motor Part: Belt-Type CVT)

As shown in FIG. 8, in the belt-type CVT 32, the endless belt 63 made of rubber is wound around both the driving pulley 61 whose belt winding diameter is changeable and the driven pulley 62 whose belt winding diameter is also changeable, and these are encased in the CVT case 64. It should be noted that a metal belt may be used as the endless belt 63.

The belt-type CVT 32 is provided with the centrifugal clutch 65 to which a rotary driving force is transmitted from the crankshaft 31C of the engine 31, and the driving pulley 61 is provided on the output shaft 65A of the centrifugal clutch 65. The driven pulley 62 is provided on the input shaft 33A of the transmission. The output shaft 65A of the centrifugal clutch 65 is arranged coaxially with the crankshaft 31C and serves as the output shaft 65A of the engine 31.

When a rotational speed of the crankshaft 31C is less than a set value, the centrifugal clutch 65 is in a cut-off state, and a turning force of the crankshaft 31C is not transmitted to the output shaft 65A. When the rotational speed of the crankshaft 31C is above the set value, the centrifugal clutch 65 is in a connecting state, and the turning force of the crankshaft 31C is transmitted to the output shaft 65A.

The driving pulley 61 includes a fixed sheave 61A disposed on a base end side (closer side to the engine 31) of the output shaft 65A and a movable sheave 61B disposed on a distal end side of the output shaft 65A. In addition, on a protruding end of the output shaft 65A, a winding diameter adjusting mechanism 66 for adjusting a position of the movable sheave 61B is provided.

The winding diameter adjusting mechanism 66 is configured to move the movable sheave 61B closer to the fixed sheave 61A so as to enlarge the belt winding diameter of the driving pulley 61, as a rotational speed of the output shaft 65A becomes higher; and to the contrary, move the movable sheave 61B away from the fixed sheave 61A so as to reduce the belt winding diameter of the driving pulley 61, as the rotational speed of the output shaft 65A becomes lower.

The driven pulley 62 includes a movable sheave 62A disposed on a base end side (closer side to the transmission case 33) of the input shaft 33A, a fixed sheave 62B disposed on a distal end side of the input shaft 33A, and a coil spring 62C for exerting a biasing force in such a manner that the movable sheave 62A is biased to the fixed sheave 62B.

The coil spring 62C is configured to exert the biasing force for positioning the movable sheave 62A of the driven pulley 62 in accordance with a tensile force acting on the endless belt 63. In other words, when the belt winding diameter of the driving pulley 61 is changed, the tensile force acting on the endless belt 63 is changed. This mechanism realizes an actuation in such a manner that, as the tensile force increases, the movable sheave 62A is moved away from the fixed sheave 62B, and as the tensile force decreases, the movable sheave 62A is moved closer to the fixed sheave 62B. Therefore, when the belt winding diameter of the driving pulley 61 is small, the belt winding diameter of the driven pulley 62 is set to a large value, and to the contrary, when the belt winding diameter of the driving pulley 61 is large, the belt winding diameter of the driven pulley 62 is set to a small value.

As shown in FIG. 8, the CVT case 64 includes: a case main body 64A supported on a vehicle body side (by at least one of the transmission case 33 and the engine 31); and a cover member 64B removably supported by the case main body 64A. Among wall faces of the case main body 64A, a wall on an engine side has a cooling air inlet 64C formed therein, and a wall on a transmission case 33 side has a bulging part 64D bulging towards a side opposite to the cover member 64B (transmission case 33 side). On an outer periphery of the case main body 64A, a main flange face 64E is formed. In the case main body 64A, on an engine side (front side), a flat and vertical wall face 64W perpendicular to the output shaft 65A is formed, and on an transmission side (rear part side), a bulging wall 64X bulging from the vertical wall face 64W to the transmission case 33 side is formed, which creates the bulging part 64D. With this configuration of the bulging part 64D, a large space is formed on the transmission side relative to the driven pulley 62.

Figure 9:
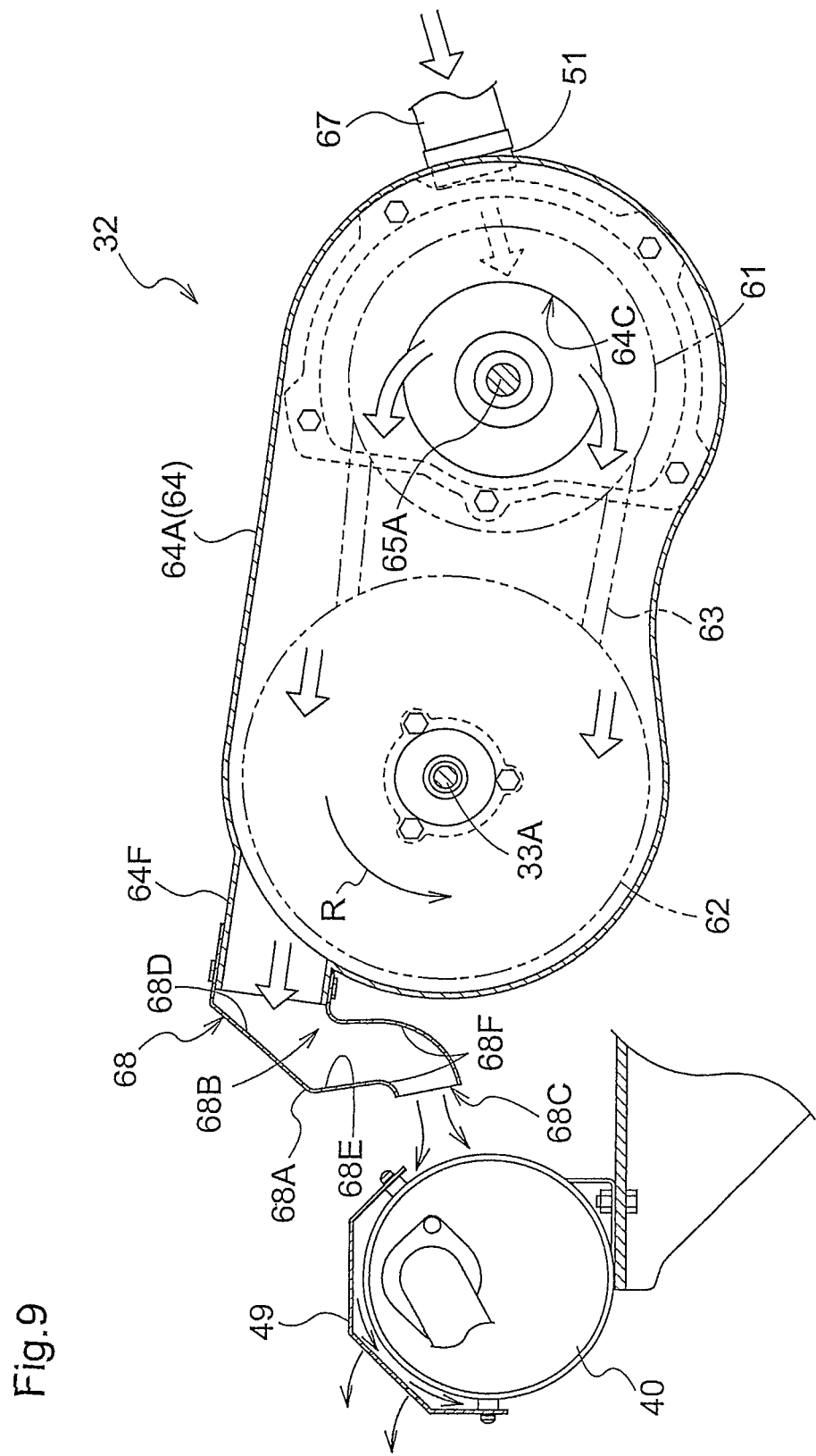
FIG. 9 is a side diagram showing the cooling air flow in the belt-type CVT.

As shown in FIG. 9, for a purpose of sending the cooling air rearward by utilizing a wind pressure generated by rotation of the driven pulley 62, a discharge part 64F is formed in the bulging part 64D, rearward of an upper part of an outer periphery of the driven pulley 62. The driven pulley 62 is configured to rotate in a direction indicated with an arrow R in FIG. 9. The cooling air introduced to the CVT case 64 cools an inside of the CVT case 64, and moves in a direction toward the discharge part 64F. With this configuration, when the cooling air is discharged from the discharge part 64F, along with the rotation of the driven pulley 62, the wind pressure in a direction toward the discharge part 64F on a rear side of the vehicle body 3 on a nearly horizontal tangent line to an upper part of the driven pulley 62 acts on the cooling air, and by utilizing the wind pressure, the cooling air is efficiently discharged from the discharge part 64F.

The cover member 64B has a dimension configured to accommodate the driving pulley 61, the winding diameter adjusting mechanism 66 and the driven pulley 62, and has a sub flange face 64G formed in an outer periphery thereof. In the CVT case 64, the case main body 64A and the cover member 64B are connected with bolts or the like, while sandwiching a seal material, such as rubber, between the main flange face 64E and the sub flange face 64G.

With this configuration, when the rotational speed of the engine 31 exceeds the set value by an operation of the accelerator pedal 15, the centrifugal clutch 65 transmits the driving force of the crankshaft 31C to the output shaft 65A. Since the output shaft 65A rotates at a low speed in an initial stage of this force transmission, the winding diameter adjusting mechanism 66 sets the belt winding diameter of the driving pulley 61 to a small value, and in conjunction with this, sets the belt winding diameter of the driven pulley 62 to a large value. Accordingly, the driving force of the engine 31 is transmitted at a low speed ratio to the input shaft 33A of the transmission case 33. When the rotational speed of the engine 31 is raised, as the output shaft 65A rotates at a higher speed, the winding diameter adjusting mechanism 66 sets the belt winding diameter of the driving pulley 61 to a large value, and in conjunction with this, sets the belt winding diameter of the driven pulley 62 to a small value. Accordingly, the driving force of the engine 31 is transmitted at a high speed ratio to the input shaft 33A of the transmission case 33.

(Motor Part: Cooling Configuration of Belt-Type CVT)

A clutch case 52 surrounding the centrifugal clutch 65 is connected to the cylinder block 31A of the engine 31, and the clutch case 52 is also connected to the case main body 64A of the CVT case 64. With this configuration, the clutch case 52 is sandwiched between the engine 31 and the CVT case 64. The intake part 51 is formed in the clutch case 52, the cooling air inlet 64C is formed in the case main body 64A connected to the clutch case 52, and the intake duct 67 for supplying the cooling air from the second air cleaner 46 is connected to the intake part 51. With this configuration, the cooling air flows from the intake part 51 into the clutch case 52, and is sent from an inside of the clutch case 52 through the cooling air inlet 64C to the inside of the CVT case 64, to thereby cool the inside of the CVT case 64. It should be noted that the intake part 51 may be formed in the case main body 64A.

The cooling air inlet 64C described above is formed in a region surrounding the output shaft 65A, and numeral intake fins 61C are formed in parts of the fixed sheave 61A of the driving pulley 61 facing the cooling air inlet 64C. In addition, in the movable sheave 62A and the fixed sheave 62B, numeral ribs 62D for reinforcement are formed which may function as exhaust fin.

As shown in FIGS. 8 and 9, the discharge part 64F is formed in a cylindrical shape and extends rearward and slightly obliquely upward from a rear upper part of the case main body 64A, and to the discharge part 64F is connected an inflow opening 68X of an exhaust duct 68. The exhaust duct 68 is bent at a base end part thereof so as to direct an exhaust direction downward, and has a bend 68A at an intermediate part so as to direct the exhaust direction inward of the vehicle body. The bend 68A is provided with a narrow part 68B for reducing a discharge pathway of the cooling air (reducing a cross sectional area of the discharge pathway). Further, an exhaust opening 68C in a terminal part of the exhaust duct 68 (downstream of the exhaust direction) is elongated in the longitudinal direction of the muffler 40 (transverse direction of the vehicle body) and the exhaust direction is oriented rearward of the vehicle body 3, so that the cooling air is discharged toward the gap between the muffler 40 and the heat shield plate 49 in a direction orthogonal to an extending direction of the muffler (longitudinal direction of the muffler 40). It should be noted that, as is apparent from FIG. 6, a cross-sectional horizontal length H2 of the exhaust opening 68C in the extending direction of the muffler is longer than a cross-sectional horizontal length H1 of the inflow opening 68X in the extending direction of the muffler, and a cross-sectional vertical length V2 of the exhaust opening 68C is shorter than a cross-sectional vertical length V1 of the inflow opening 68X. Accordingly, the cross-sectional vertical length V2 of the exhaust opening 68C is approximately half of the cross-sectional vertical length V1 of the inflow opening 68X, and the cross-sectional horizontal length H2 of the exhaust opening 68C is approximately twice the cross-sectional horizontal length H1 of the inflow opening 68X. To put it another way, roughly speaking, a cross sectional flow area of the exhaust opening 68C is approximately the same as that of the inflow opening 68X, and thus a cross sectional configuration is adapted with which the cooling air flowing through the exhaust duct 68 is efficiently brought into contact with a surface of the muffler 40.

Further, the exhaust duct 68 includes: an upper guide face 68D oriented rearward and downward for guiding the exhaust from the discharge part 64F of the CVT case 64 to the narrow part 68B; a lower guide face 68E oriented downward and frontward for downward guiding the exhaust from the narrow part 68B; and a distal end curved face 68F for guiding the exhaust from the narrow part 68B to the exhaust opening 68C. It should be noted that the exhaust direction from the exhaust opening 68C to the muffler 40 is not necessarily be horizontal, as long as the direction is orthogonal to the longitudinal direction of the muffler 40. For example, the exhaust from the exhaust opening 68C may be blown obliquely upward or obliquely downward toward the muffler 40. In addition, between the exhaust opening 68C and the ground perpendicularly below the exhaust opening 68C, a free space is provided, and thus the exhaust from the exhaust opening 68C can smoothly escape form inside the vehicle body 1, without being hindered by vehicle components.

With this configuration, along with driving rotation of the driving pulley 61, a negative pressure is generated by the intake fins 61C, and ambient air sucked into the second air cleaner 46 by this negative pressure is then sucked as the cooling air from the cooling air inlet 64C through the intake duct 67 to the CVT case 64. The thus sucked cooling air flows from the driving pulley 61 to the driven pulley 62 in the CVT case 64, and while flowing in this manner, the cooling air is brought into contact with the driving pulley 61, the driven pulley 62 and the endless belt 63 to remove heat therefrom and cool them.

The cooling air with which heat is removed from the inside of the CVT case 64 then flows into the bulging part 64D formed in the case main body 64A, and along with an air flow caused by the rotation of the driven pulley 62, the cooling air is discharged from the discharge part 64F to an outside of the CVT case 64. In addition, when the cooling air is sent from the discharge part 64F to the exhaust duct 68, the flow is suppressed at the narrow part 68B, and thus an internal pressure of the CVT case 64 is increased. In this manner, by increasing the internal pressure of the CVT case 64, water, dust and the like can be prevented from entering a gap between the main flange face 64E of the case main body 64A and the sub flange face 64G of the cover member 64B. Then, the cooling air which has reached a terminal of the exhaust duct 68 is supplied from the exhaust opening 68C to the gap between the muffler 40 and the heat shield plate 49, and heat can be released from the muffler 40.

Effect of Embodiment

As described above, according to the present invention, the cooling air supplied to the CVT case 64 is brought into contact with the driving pulley 61, the driven pulley 62, and the endless belt 63, to thereby cool them. In addition, since the cooling air is supplied from the case main body 64A of the CVT case 64 and the cooling air is discharged from the discharge part 64F of the case main body 64A, even during an operation of removing the cover member 64B, it is not necessary to remove a duct for supplying the cooling air, a duct for exhausting the cooling air and the like, and thus the operation is facilitated.

In the case main body 64A, the bulging part 64D bulging in a side opposite to the cover member 64B (the transmission case 33 side) is formed, and the discharge part 64F is formed in the bulging part 64D. In the discharge part 64F, along with the rotation of the driven pulley 62, the wind pressure acting in a tangential direction from the upper part of the driven pulley 62 to the discharge part 64F can be acted on the cooling air, and the discharge is efficiently performed. In addition, a relatively large space away from the driven pulley 62 is secured in the bulging part 64D, and thus when the cooling air is discharged from the bulging part 64D to the discharge part 64F, the discharge can be efficiently performed without being blocked by the pulley and the endless belt. Moreover, when the cooling air is sent from the discharge part 64F to the exhaust duct 68, by restricting the flow at the narrow part 68B, the internal pressure of the CVT case 64 is increased, and thus water, dust and the like can be prevented from entering a connecting interface between the case main body 64A and the cover member 64B.

Further, the cooling air discharged from the exhaust opening 68C of the exhaust duct 68 is sent to a wide area along the longitudinal direction of the muffler 40. Furthermore, since the cooling air is discharged rearward of the vehicle body 3 and supplied to the gap between the muffler 40 and the heat shield plate 49, the cooling air reaches the surface of the muffler 40 without being influenced by the air flow from outside even when the vehicle body 3 is running, and thus the cooling of the muffler 40 can be excellently performed.

Especially, in the belt-type CVT 32, a strong tensile force tends to be exerted in the endless belt 63, which then acts on both the output shaft 65A and the input shaft 33A, and thus on both the engine 31 and the transmission case 33 in a direction that makes the output shaft 65A and the input shaft 33A nonparallel. On the other hand, since the connecting plate 41 connects the upper part of the engine 31 and the upper part of the transmission case 33 in such a manner that the connecting plate 41 is arranged in a posture that can firmly resist an action of the tensile force, the relative position between the engine 31 and the transmission case 33 can be retained with high accuracy.

In addition, since the connecting plate 41 is disposed above the space 30A between the engine 31 and the transmission case 33, water can be prevented from entering the electric components, such as the generator 42 and the starter motor 43, arranged in the space below the connecting plate 41. Accordingly, when the vehicle body is washed with high pressure or when it rains hard, the problem of failure of the electric components caused by water can be solved.

The cooling structure of the present invention is applicable not only to the above-described work vehicle, but also to various types of vehicles having the engine and the belt-type CVT.

What is claimed is:

1. A work vehicle having an engine and a belt-type CVT, comprising:
    a muffler which is configured to flow exhaust from the engine and extends in a transverse direction of a vehicle body so as to allow the exhaust from the engine to flow in the transverse direction of the vehicle body;
    a CVT case which is configured to cover the belt-type CVT and positioned frontward of the muffler in a longitudinal direction of the vehicle body, the CVT case including a cooling structure configured to introduce cooling air from outside, cool the belt-type CVT, and discharge the cooling air from a discharge part; and
    an exhaust duct including: an inflow opening to be connected to the discharge part of the CVT case for allowing the cooling air to flow into the exhaust duct; and an exhaust opening for allowing the cooling air to flow out rearward of the vehicle body;
    wherein the exhaust opening is elongated in an extending direction of the muffler and oriented in a direction that allows the cooling air flowing out to hit the muffler;
    wherein a cross-sectional horizontal length of the exhaust opening in the extending direction of the muffler is longer than a cross-sectional horizontal length of the inflow opening, and a cross-sectional vertical length of the exhaust opening is shorter than a cross-sectional vertical length of the inflow opening.

2. The work vehicle according to claim 1, wherein
    the cross-sectional horizontal length of the exhaust opening is approximately twice the cross-sectional horizontal length of the inflow opening.

3. The work vehicle according to claim 2, wherein
    a cross sectional flow area of the exhaust opening is approximately the same as a cross sectional flow area of the inflow opening.

4. The work vehicle according to claim 1, wherein
a heat shield plate is arranged along an outer face of the muffler at a distance, and
the exhaust opening is oriented in a direction that allows the cooling air discharged from the exhaust duct to flow into a space between the muffler and the heat shield plate.

5. The work vehicle according to claim 1, wherein
the exhaust duct and the muffler are arranged at a position rearward of a shaft of a rear wheel in the longitudinal direction of the vehicle body.

6. The work vehicle according to claim 1, wherein
a free space is provided between the exhaust opening and the ground perpendicularly below the exhaust opening.

* * * * *